United States Patent
Chang et al.

(10) Patent No.: US 9,371,026 B2
(45) Date of Patent: Jun. 21, 2016

(54) TABLE APPARATUS FOR REAR SEAT PASSENGERS

(71) Applicants: Hyundai Motor Company, Seoul (KR); Kia Motors Corp., Seoul (KR); ECOPLASTIC CORPORATION, Gyeongju-si (KR)

(72) Inventors: Hong Sik Chang, Whasung-Si (KR); Myeong Ho Lee, Whasung-Si (KR)

(73) Assignees: Hyundai Motor Company, Seoul (KR); Kia Motors Corp., Seoul (KR); ECOPLASTIC CORPORATION, Gyeongju-si (KR)

( * ) Notice: Subject to any disclaimer, the term of this patent is extended or adjusted under 35 U.S.C. 154(b) by 0 days.

(21) Appl. No.: 14/478,758

(22) Filed: Sep. 5, 2014

(65) Prior Publication Data
US 2015/0183355 A1    Jul. 2, 2015

(30) Foreign Application Priority Data

Dec. 27, 2013    (KR) .................. 10-2013-0164907

(51) Int. Cl.
*A47B 23/00*    (2006.01)
*B60N 3/00*    (2006.01)

(52) U.S. Cl.
CPC .................................... *B60N 3/002* (2013.01)

(58) Field of Classification Search
CPC ........ B60N 3/001; B60N 3/002; B60N 3/003; B64D 11/0638
USPC ........................................................ 108/39
See application file for complete search history.

(56) References Cited

U.S. PATENT DOCUMENTS

| | | | | |
|---|---|---|---|---|
| 5,927,799 A * | 7/1999 | Tornero | .................. | A47C 7/70 297/145 |
| 6,793,281 B2 * | 9/2004 | Duerr | .................. | B60N 2/4606 297/147 |
| 7,311,354 B2 * | 12/2007 | Giasson | ............. | B64D 11/0638 297/145 |
| 8,020,808 B2 * | 9/2011 | Collins | .................. | B60N 3/002 244/118.5 |
| 8,448,581 B2 * | 5/2013 | Hanna | .................... | B64D 11/06 108/137 |
| 2002/0050733 A1 * | 5/2002 | Hansel | .................. | B60N 2/206 297/367 R |
| 2005/0045071 A1 * | 3/2005 | Lindstrom | ............. | B60N 3/002 108/44 |
| 2006/0220425 A1 * | 10/2006 | Becker | .................. | B60N 3/002 297/188.16 |

(Continued)

FOREIGN PATENT DOCUMENTS

| JP | 2009-113586 A | 5/2009 |
|---|---|---|
| KR | 1998-013596 U | 6/1998 |

(Continued)

*Primary Examiner* — Hanh V Tran
(74) *Attorney, Agent, or Firm* — Morgan, Lewis & Bockius LLP

(57) ABSTRACT

A table apparatus for rear seat passengers may include a table housing rotatable upwards and downwards around a support shaft coupled to a sidewall of a rear console, a movable body movable along a guide provided in the table housing, a rotating body coupled to the movable body by a body shaft and rotatable upwards and downwards with respect to the movable body, a table coupled to the rotating body by a table shaft and rotatable leftwards and rightwards with respect to the rotating body, and a table tilting unit provided in the movable body and the rotating body, the table tilting unit controlling a rotation angle of the rotating body to determine a tilting angle of the table.

16 Claims, 13 Drawing Sheets

(56) References Cited

U.S. PATENT DOCUMENTS

| | | | |
|---|---|---|---|
| 2008/0121774 A1* | 5/2008 | Johnson | A47B 83/02 248/311.2 |
| 2010/0064476 A1 | 3/2010 | Zeman | |
| 2010/0133857 A1* | 6/2010 | Kim | B60N 3/004 292/297 |
| 2012/0049585 A1* | 3/2012 | Kim | B60N 3/002 297/173 |
| 2012/0292972 A1* | 11/2012 | Hofmann | B60N 2/20 297/354.12 |

FOREIGN PATENT DOCUMENTS

| | | |
|---|---|---|
| KR | 10-1998-041289 A | 8/1998 |
| KR | 1998-029722 U | 8/1998 |
| KR | 10-2007-0062726 A | 6/2007 |
| KR | 10-2012-0020918 A | 3/2012 |

* cited by examiner

United States Patent US 9,371,026 B2

TABLE APPARATUS FOR REAR SEAT PASSENGERS

CROSS-REFERENCE(S) TO RELATED APPLICATION

The present application claims priority of Korean Patent Application Number 10-2013-0164907 filed on Dec. 27, 2013, the entire contents of which application are incorporated herein for all purposes by this reference.

BACKGROUND OF THE INVENTION

1. Field of the Invention

The present invention relates generally to table apparatuses for rear seat passengers and, more particularly, to a table apparatus for rear seat passengers which is configured such that a table is received and stored in a sidewall of a rear console when not in use, and is extracted from the console when needed.

2. Description of Related Art

Generally, luxury sedans are provided with rear seats which have automatic seat condition control functions for the sake of convenience of rear seat passengers. Such automatic seat condition control functions include a forward-rearward location adjustment function, a seat back angle adjustment function, a shoulder support adjustment function, etc.

Furthermore, as the location and angle adjustment functions of the rear seats are diversified, improvement in application of a table to a rear seat is required for the sake of convenience of reading, taking notes, using a tablet PC, etc. However, most table apparatuses have only the functions of receiving and storing a table and extracting it when needed but have no function of adjusting the location and angle of the table depending on the location and angle of the rear seat. Therefore, it may be inconvenient for a rear seat passenger to use the table.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a table apparatus for rear seat passengers in which a table is received and stored in a sidewall of a rear console when not in use, and can be extracted from the console, when needed, and appropriately adjusted in location and angle depending on the location and angle of a rear seat, thus making it more convenient for a rear seat passenger to use.

In various aspects of the present invention, a table apparatus for rear seat passengers, may include a table housing provided so as to be rotatable upwards and downwards around a support shaft coupled to a sidewall of a rear console, a movable body installed so as to be movable along a guide provided in the table housing, a rotating body coupled to the movable body by a body shaft so as to be rotatable upwards and downwards with respect to the movable body, a table coupled to the rotating body by a table shaft so as to be rotatable leftwards and rightwards with respect to the rotating body, and a table tilting unit provided in the movable body and the rotating body, the table tilting unit controlling a rotation angle of the rotating body to determine a tilting angle of the table.

The table tilting unit may include: a movable body latch coupled to the movable body, the movable body having gear teeth on a circumferential arc-shaped surface thereof corresponding to a radius of rotation of the rotating body, and a rotating body latch coupled to the rotating body so as to be elastically rotatable by a latch shaft and a latch spring, wherein the rotation angle of the rotating body and the tilting angle of the table are determined depending on conditions at which the rotating body latch is coupled to the movable body latch.

The table apparatus may further include a wire shaft coupled to the table housing to provide a deceleration function and an automatic reception function when the table is extracted from or retracted into the table housing, a wire casing installed so as to be rotatable around the wire shaft, a wire spring coupled at a first end thereof to the wire shaft and coupled at a second end thereof to the wire casing, respectively, thus providing restoring force to the wire casing that is rotated from an original position thereof, and a wire connecting the wire casing to the table.

The table apparatus may further include a rotating roller rotatably coupled to the movable body by a roller shaft, the rotating roller being brought into contact with a front edge of the rotating body, wherein the rotating roller assists movement of the rotating body when the rotating body rotates around the body shaft.

The table apparatus may further include a rotating body protrusion radially protruding from a lower end of the front edge of the rotating body, wherein when the rotating body rotates around the body shaft in a direction in which the rotating body is extracted from the movable body, the rotating body protrusion comes into contact with the rotating roller, thus defining a maximum rotation angle of the rotating body.

The table apparatus may further include a table support supporting the table in such a way that a first end of the table support is supported on the movable body and a second end thereof supports a lower surface of the table when the table is rotated perpendicular to the rotating body.

The table may include a base table rotatably coupled to the rotating body by the table shaft, the lower surface of the base table being supported on the table support, and an extension table coupled to the base table by a table hinge so as to be foldable and unfoldable.

The table apparatus may further include a table housing tilting unit provided around the support shaft and connected both to the rear console and to the table housing, the table housing tilting unit determining the rotation angle of the table housing.

The table housing tilting unit may include an inner hinge fastened to the rear console and having, in each of opposite sides of an outer circumferential surface thereof, both a stopper depression defining a range of rotation of the table housing, and bearing depressions determining the rotation angle of the table housing, an outer hinge coupled to the table housing, the inner hinge being disposed in the outer hinge, with a stopper hole formed in the outer hinge at a position corresponding to the stopper depression, and bearing holes formed in the outer hinge at positions corresponding to the bearing depressions, a stopper having a bearing shape and coming into contact with the stopper depression through the stopper hole, the stopper defining, along with the stopper depression, the range of rotation of the table housing, a plate spring integrally connected at a first end thereof to the stopper and coupled at a second end thereof to the outer hinge, the plate spring bringing the stopper into contact with the stopper depression using elastic force thereof, and a plurality of ball bearings in contact with the respective bearing depressions through the corresponding bearing holes, the ball bearings determining the rotation angle of the table housing when the outer hinge rotates.

The table housing tilting unit may include a rotating lever having a lever body part surrounding a portion of the outer hinge in which the bearing holes are formed, and a lever part integrally extending from the lever body part, a lever hole formed in the lever body part, the ball bearings coming into contact with an inner surface of the lever body part that defines the lever hole therein, and a plurality of releasing depressions formed in the inner surface of the lever body part and used for unlocking of the ball bearing, the number of releasing depressions corresponding to the number of the ball bearings.

The table housing tilting unit may further include a spring housing in contact with the outer hinge, the spring housing being coupled to the table housing, a lever spring disposed in the spring housing, the lever spring being coupled at a first end thereof to the table housing and coupled at a second end thereof to the rotating lever, wherein the lever spring provides restoring force to the rotating lever that is rotated from an original position thereof, and a cover plate coupled to a surface of the inner hinge.

The stopper depressions formed in the inner hinge may be disposed at symmetric positions based on a center of the inner hinge, each of the stopper depressions extending a predetermined length along the outer circumferential surface of the inner hinge.

A stop protrusion may be provided in each of the stopper depressions such that an initial position of the corresponding stopper is determined by the stop protrusion and, when the outer hinge rotates, the stopper is allowed to pass over the stop protrusion.

The bearing depressions may be formed in the outer circumferential surface of the inner hinge at positions spaced apart from each other at regular intervals.

An initial position determination depression may be formed in the outer circumferential surface of the inner hinge and connected to one among the bearing depressions, the initial position determination depression determining an initial position of the outer hinge.

The table apparatus may further include an actuating rod connected at a first end thereof to the lever part of the rotating lever while a second end thereof protrudes out of the table housing, the actuating rod being operated by manipulation of a user to actuate the rotating lever.

A lever protrusion may integrally protrude from the lever part so that the rotating lever is connected to the actuating rod by the lever protrusion, and a protrusion hole may be formed in an end of the actuating rod, the protrusion hole being fitted over the lever protrusion, wherein the protrusion hole may comprise a slot to allow the lever protrusion to move relative to the actuating rod by a predetermined distance when the rotating lever rotates.

In a table apparatus for rear seat passengers according to the present invention, when not in use, a table is brought into close contact with a sidewall of a rear console and is not exposed to the outside, thus preventing deterioration of the appearance. When in use, a user can adjust the location of the table in response to the forward-backward location of and angle of a seat back. Therefore, the user can use the table in as comfortable position as possible. As a result, the convenience in use of the table can be markedly enhanced.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 is a view illustrating a table housing tilting unit according to an exemplary embodiment of the present invention, wherein

FIG. 6 is a view illustrating a table housing tilting unit according to an exemplary embodiment of the present invention, wherein

FIG. 7 is a view illustrating a table housing tilting unit according to an exemplary embodiment of the present invention, wherein

FIG. 8 is a view illustrating a table housing tilting unit according to an exemplary embodiment of the present invention, wherein

FIG. 9 is a view illustrating a table housing tilting unit according to an exemplary embodiment of the present invention, wherein

FIG. 10 is a view illustrating a table housing tilting unit according to an exemplary embodiment of the present invention, wherein

FIG. 11 is a view illustrating a table housing tilting unit according to an exemplary embodiment of the present invention, wherein

FIG. 12 is a view illustrating a table housing tilting unit according to an exemplary embodiment of the present invention, wherein

Figure 1:
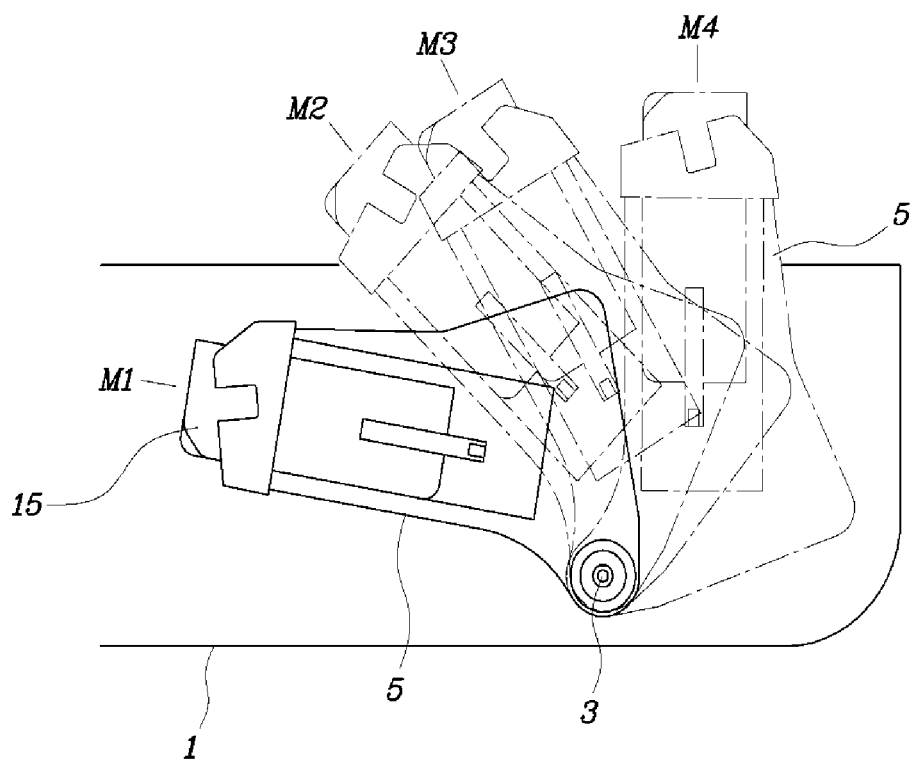
FIG. 1 is a view illustrating a table apparatus for rear seat passengers which is installed on a side surface of a rear console, according to an exemplary embodiment of the present invention.
Figure 2:
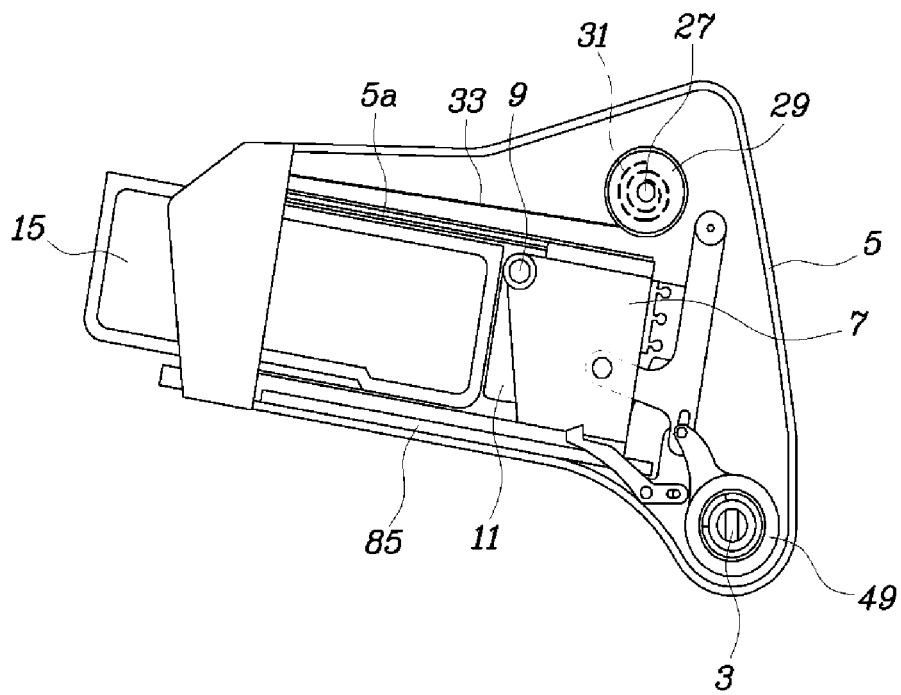
FIG. 2 is a view showing the internal construction of the table apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a table apparatus for rear seat passengers according to a preferred embodiment of the present invention will be described in detail with reference to the attached drawings.

As shown in FIGS. 1 through 17, a table apparatus for rear seat passengers according to an exemplary embodiment of the present invention includes a table housing 5, a movable body 7, a rotating body 11, a table 15 and a table tilting unit 17. The table housing 5 is provided so as to be rotatable upwards and downwards around a support shaft 3 coupled to a sidewall of a rear console 1. The movable body 7 is installed so as to be movable along a guide 5a provided in the table housing 5. The rotating body 11 is coupled to the movable body 7 by a body shaft 9 so as to be rotatable upwards and downwards with respect to the movable body 7. The table 15 is coupled to the rotating body 11 by a table shaft 13 so as to be rotatable leftwards and rightwards with respect to the rotating body 11. The table tilting unit 17 is provided in the movable body 7 and the rotating body 11 and controls a rotation angle of the rotating body 11 to determine a tilting angle of the table 15.

FIG. 1 is a view showing the states of the table housing 5 by tilting angles while it rotates from a retracted position to an extracted position. State M1 refers to an initial retracted state in which the table housing 5 is in close contact with the sidewall of the rear console 1 without protruding from the rear console 1. State M2 shows the table housing 5 that is rotated to about 45°. State M3 shows the table housing 5 that is rotated to about 68°. State M4 shows that table housing 5 that is rotated to 90°, that is, to the maximum.

Preferably, the tilting angle of the table housing 5 can be appropriately adjusted to satisfy conditions at which a rear seat passenger can use the table in as comfortable position as possible in response to the forward-backward location of a rear seat and the angle at which a seat back is tilted.

The table tilting unit 17 includes a movable body latch 19 which is coupled to the movable body 7 and has gear teeth on a circumferential arc-shaped surface thereof corresponding to a radius of rotation of the rotating body 11, and a rotating body latch 25 which is coupled to the rotating body 11 so as to be elastically rotatable by a latch shaft 21 and a latch spring 23. The rotation angle of the rotating body 11 and the tilting angle of the table 15 are determined depending on conditions at which the rotating body latch 25 is coupled to the movable body latch 19.

Figure 16:
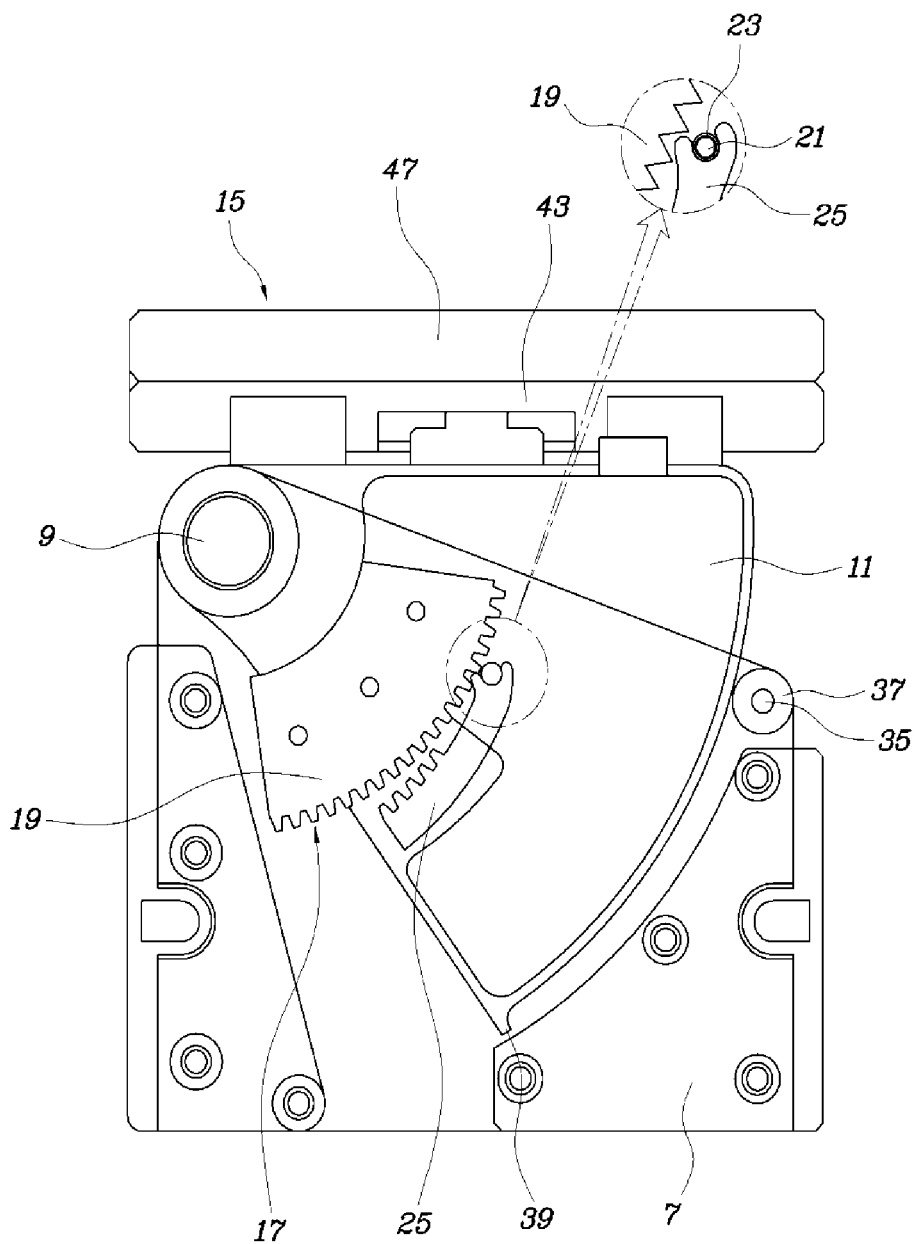
FIG. 16 is a view illustrating a table tilting unit according to an exemplary embodiment of the present invention.

Although the tilting angle of the table 15 is set such that it can be rotated to 45° in a counterclockwise direction from a horizontal state of FIG. 16 by engagement between the rotating body latch 25 and the movable body latch 19, the present invention is not limited to this.

The table apparatus according to an exemplary embodiment of the present invention further includes a wire shaft 27, a wire casing 29, a wire spring 31 and a wire 33. The wire shaft 27 is coupled to the table housing 5 to provide a deceleration function and an automatic reception function when the table 15 is extracted from or retracted into the table housing 5. The wire casing 29 is installed so as to be rotatable around the wire shaft 27. The wire spring 31 is coupled at a first end thereof to the wire shaft 27 and is coupled at a second end thereof to the wire casing 29, thus providing restoring force to the wire casing 29 that is rotated from its original position. The wire 33 connects the wire casing 29 to the table 15.

The table apparatus according to an exemplary embodiment of the present invention further includes a rotating roller 37 and a rotating body protrusion 39. The rotating roller 37 is rotatably coupled to the movable body 7 by a roller shaft 35 and is brought into contact with a front edge of the rotating body 11. The rotating roller 37 functions to assist movement of the rotating body 11 when rotating body 11 rotates around the body shaft 9. The rotating body protrusion 39 radially protrudes from a lower end of the front edge of the rotating body 11. When the rotating body 11 rotates around the body shaft 9 in a direction in which the rotating body 11 is extracted from the movable body 7, the rotating body protrusion 39 comes into contact with the rotating roller 37, thus defining the maximum rotation angle of the rotating body 11.

The table apparatus according to an exemplary embodiment of the present invention further includes a table support 41 which supports the table 15 in such a way that a first end of the table support 41 is supported on the movable body 7 and a second end thereof supports a lower surface of the table 15 when the table is rotated perpendicular to the rotating body 11.

The table 15 according to an exemplary embodiment of the present invention includes a base table 43 which is rotatably coupled to the rotating body 11 by the table shaft 13 and is supported on the lower surface thereof on the table support 41, and an extension table 47 which is coupled to the base table 43 so as to be foldable and unfoldable by a table hinge 45.

The table apparatus according to an exemplary embodiment of the present invention further includes a table housing tilting unit 49 which is provided around the support shaft 3 and connected both to the rear console 1 and to the table housing 5. The table housing tilting unit 49 determines the rotation angle of the table housing 5.

The table housing tilting unit 49 includes an inner hinge 55, an outer hinge 61, stoppers 63, plate springs 65 and ball bearings 67. The inner hinge 55 is fixed to the rear console 1 and has, in opposite sides of an outer circumferential surface thereof, both stopper depressions 51 which define a range within which the table housing 5 can rotate, and bearing depressions 53 which are used to determine the rotation angle of the table housing 5. The outer hinge 61 is coupled to the table housing 5 and receives the inner hinge 54 therein. Stopper holes 57 are formed in the outer hinge 61 at positions corresponding to the respective stopper depressions 51. Bearing holes 59 are formed in the outer hinge 61 at positions corresponding to the respective bearing depressions 53. The stoppers 63, each of which has a bearing shape, are provided so as to be in contact with the respective stopper depressions 51 through the corresponding stopper holes 57. The stoppers 63 function to define, along with the stopper depressions 51, the range within which the table housing 5 can rotate. Each plate spring 65 is integrally connected at a first end thereof to the corresponding stopper 63 and is coupled at a second end thereof to the outer hinge 61. The plate spring 65 functions to bring the stopper 63 into contact with the corresponding stopper depression 51 using elastic force thereof. The ball bearings 67 are provided so as to be in contact with the selected bearing depressions 53 through the corresponding bearing holes 59. The ball bearings 67 are used to determine the rotation angle of the table housing 5 when the outer hinge 61 rotates.

The table housing tilting unit 49 includes a rotating lever 73 which has a lever body part 69 and a lever part 71. The lever body part 69 surrounds a portion of the outer hinge 61 in which the bearing holes 59 are formed. The lever part 71 integrally extends from the lever body part 69. A lever hole 75 is formed in the lever body part 69, and the ball bearings 67 come into contact with an inner surface of the lever body part 69 that defines the lever hole 75 therein. Releasing depressions 77, the number of which corresponds to that of the ball bearings 67, are formed in the inner surface of the lever body part 69 and used for unlocking of the ball bearings 67.

The table housing tilting unit 49 further includes a spring housing 79, a lever spring 81 and a cover plate 83. The spring housing 79 is brought into contact with the outer hinge 61 and is coupled to the table housing 5. The lever spring 81 is disposed in the spring housing 79. A first end of the lever spring 81 is coupled to the table housing 5, and a second end thereof is coupled to the rotating lever 73. The lever spring 81 provides restoring force to the rotating lever 73 that is rotated from its original position. The cover plate 83 is coupled to a surface of the inner hinge 55.

In this embodiment, the stopper depressions 51 that are formed in the inner hinge 55 include two stopper depressions 51. The two stopper depressions 51 are formed in the outer circumferential surface of the inner hinge 55 at diametrically opposite sides based on the center of the inner hinge 55. Each stopper depression 51 extends a predetermined length along the outer circumferential surface of the inner hinge 55.

A stop protrusion 51a is provided in each stopper depression 51 and is configured such that when the outer hinge 61 is not in rotation, the initial position of the corresponding stopper 63 is determined by the stop protrusion 51a, and when the outer hinge 61 rotates, the stopper 63 can pass over the stop protrusion 51a.

The bearing depressions 53 are formed in the outer circumferential surface of the inner hinge 51 at positions spaced apart from each other at regular intervals. The angle between the adjacent bearing depressions 53 is determined in response to the tilting angle of the table housing 5.

Furthermore, an initial position determination depression 53a is formed in the outer circumferential surface of the inner hinge 51 and connected to one among the bearing depressions 53. The initial position determination depression 53a determines the initial position of the outer hinge 61.

The table apparatus according to an exemplary embodiment of the present invention further includes an actuating rod 85 which is installed in such a way that a first end thereof is connected to the lever part 71 of the rotating lever 73 and a second end thereof protrudes out of the table housing 5. The user can use the actuating rod 85 to operate the rotating lever 73. A lever protrusion 71a integrally protrudes from the lever part 71 of the rotating lever 73 so that the rotating lever 73 is connected to the actuating rod 85 by the lever protrusion 71a. A protrusion hole 85a which is fitted over the lever protrusion 71a is formed in an end of the actuating rod 85. The protrusion hole 85a is a slot to allow the lever protrusion 71a to move relative to the actuating rod 85 by a predetermined distance when the rotating lever 73 rotates.

The operation of the exemplary embodiment of the present invention will be explained below.

In FIG. 1, state M1 of the table housing 5 refers to the initial retracted state in which the table housing 5 is in close contact with the sidewall of the rear console 1 without protruding from the rear console 1.

Figure 3A:
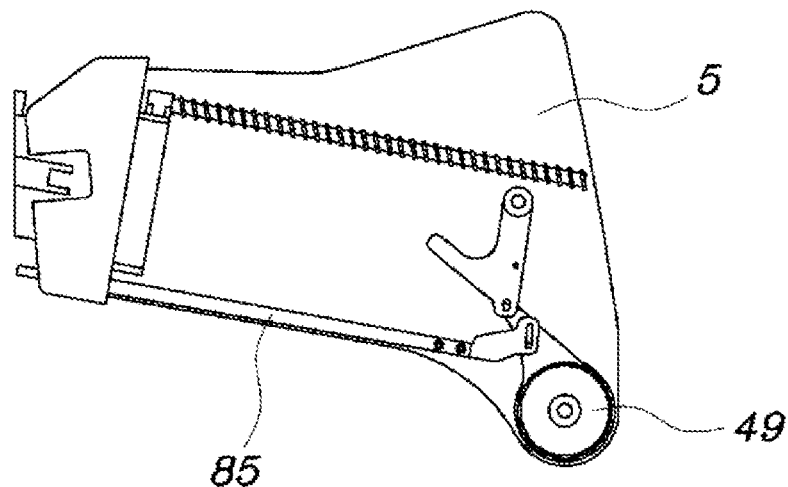
FIGS. 3A and 3B are views showing an actuating rod which is not in operation according to an exemplary embodiment of the present invention.
Figure 3B:
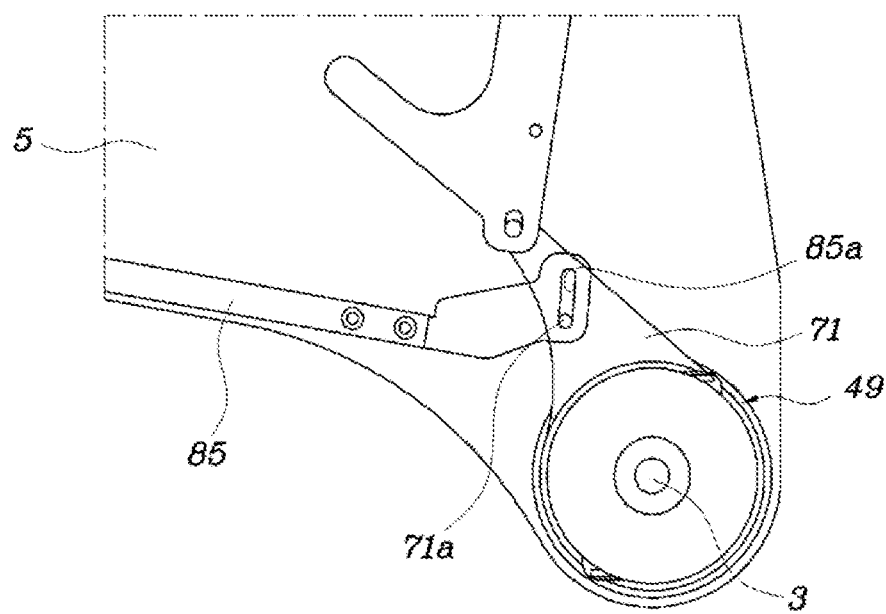
Figure 10:
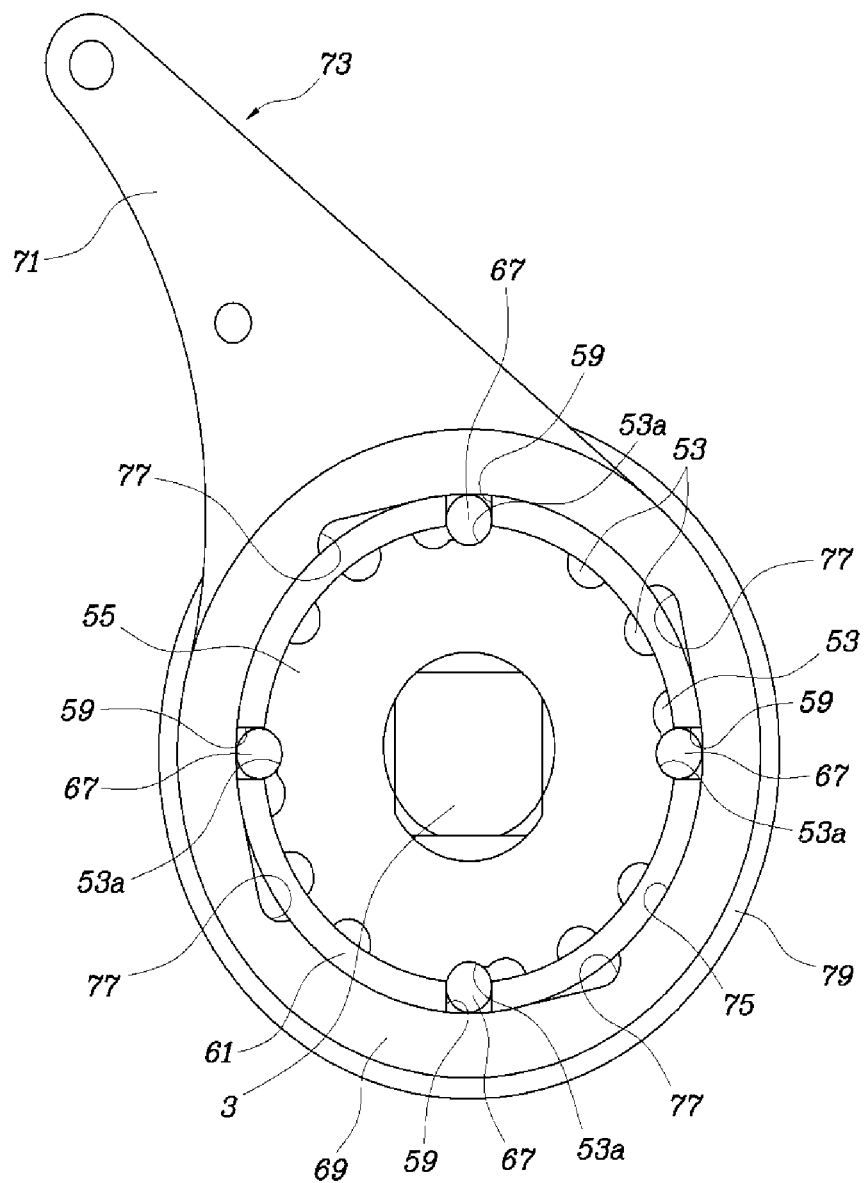

In the initial retracted state, as shown in FIGS. 3A and 3B, the rotating lever 73 is not rotated such that the lever part 71 is in a state of being rotated to the left. As shown in FIG. 10, the ball bearings 67 are disposed both in the corresponding bearing holes 59 of the outer hinge 61 and in the corresponding lever holes 75 of the rotating lever 73 and are in a state of being completely inserted in the corresponding initial position determination depressions 53a of the bearing depressions 53 of the inner hinge 55.

Therefore, in the initial retracted state, even if the user tries to rotate the table housing 5 upwards, the table housing 5 remains in the locked state without rotating by support force of the ball bearings 67 that are disposed in the bearing holes 59, the lever holes 75 and the initial position determination depressions 53a.

Figure 4A:
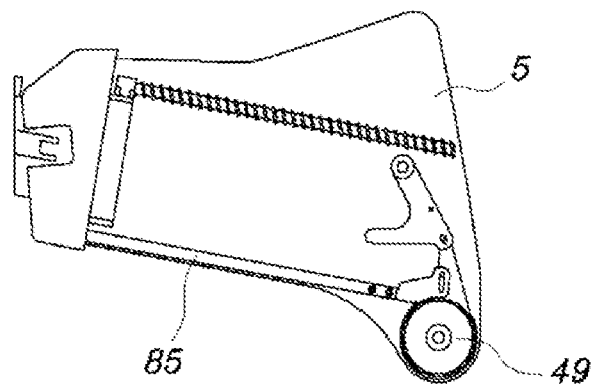
FIGS. 4A and 4B are views showing the actuating rod which is in the operation according to an exemplary embodiment of the present invention.
Figure 4B:
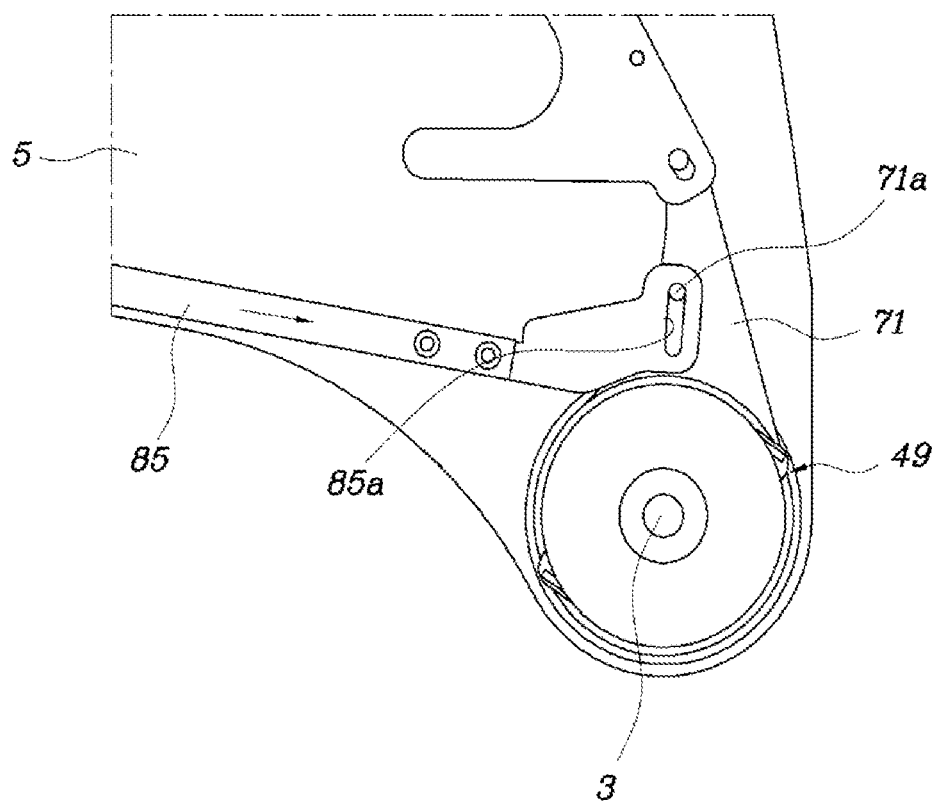
Figure 5:
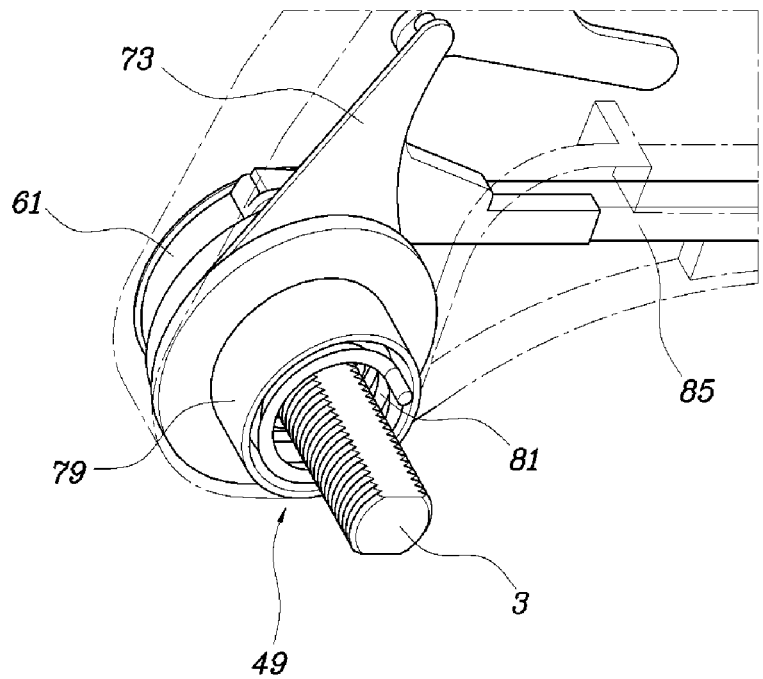
Figure 6:
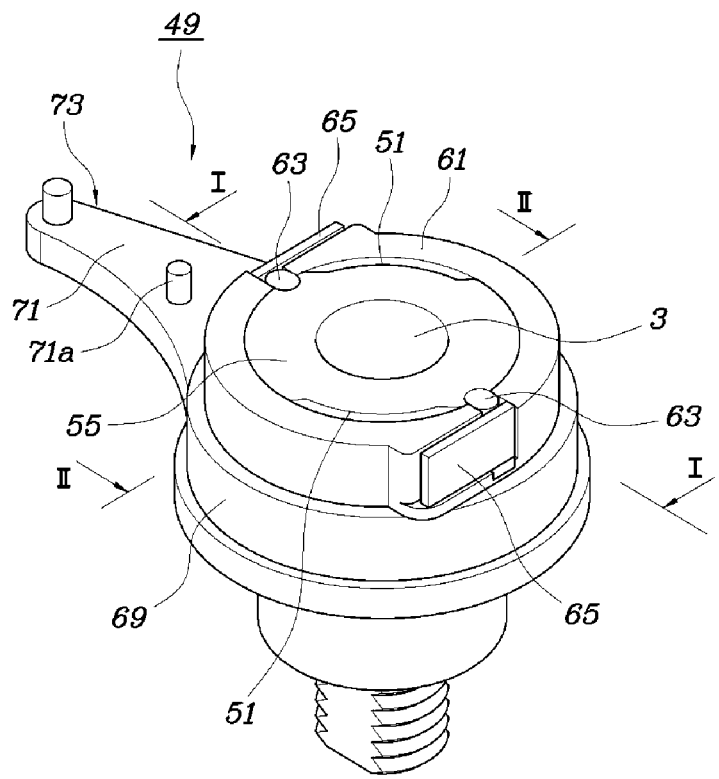
Figure 7:
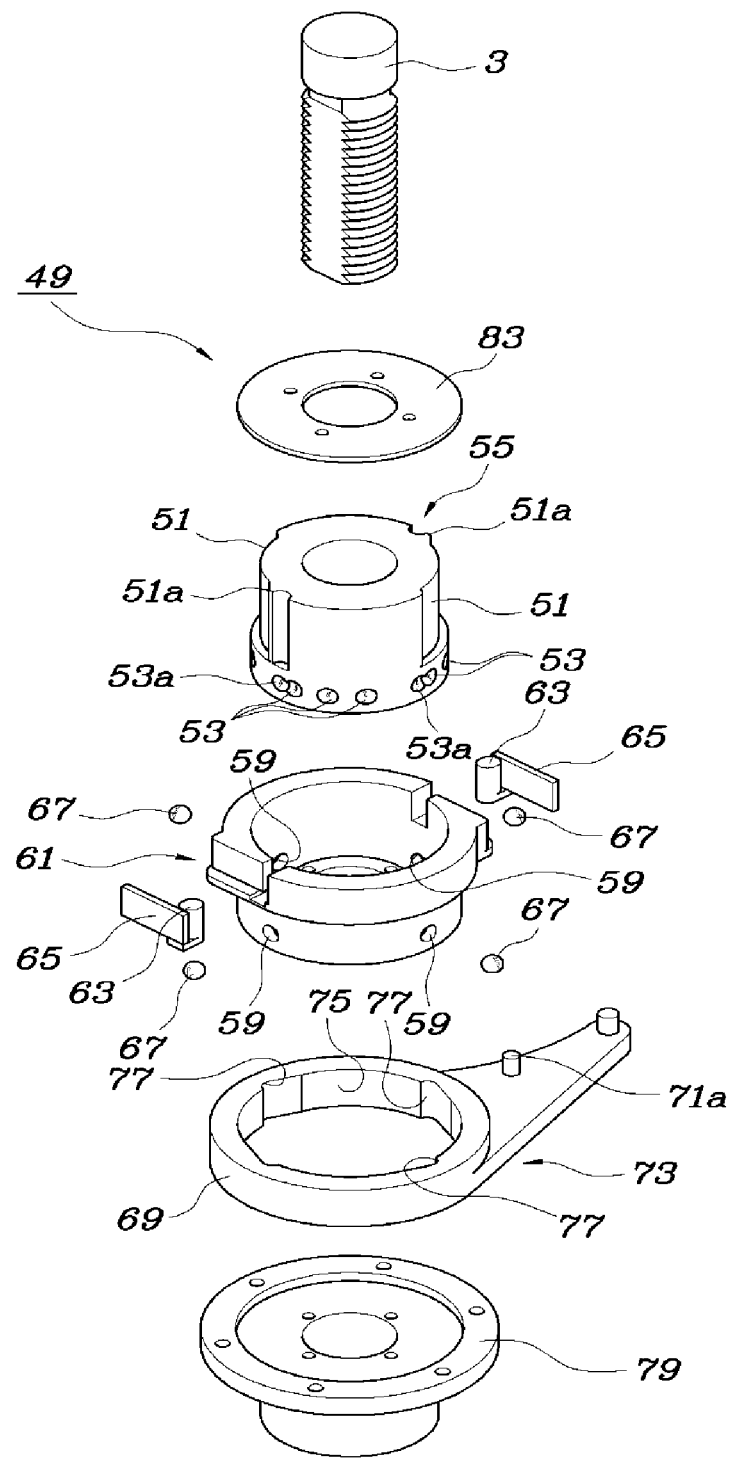
Figure 8:
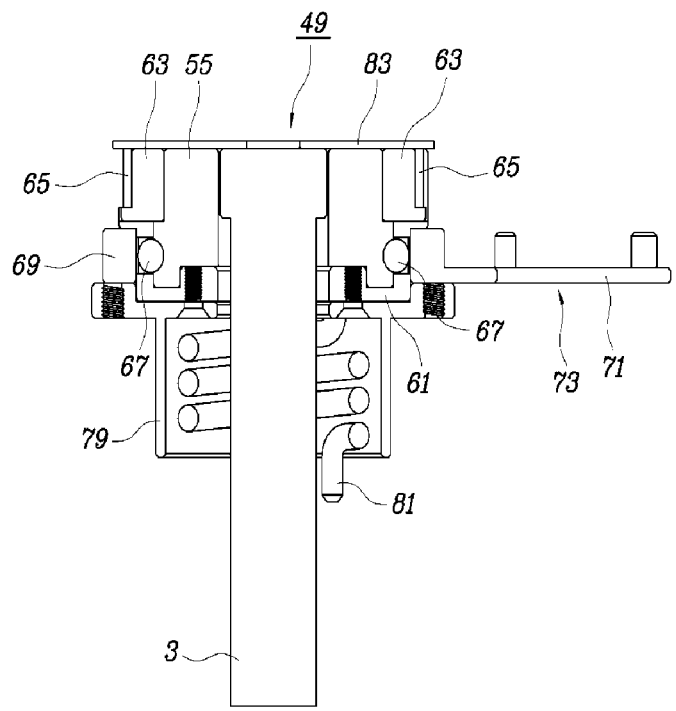
FIGS. 8 and 9 are respectively sectional views taken along line I-I and line II-II of FIG. 6.
Figure 9:
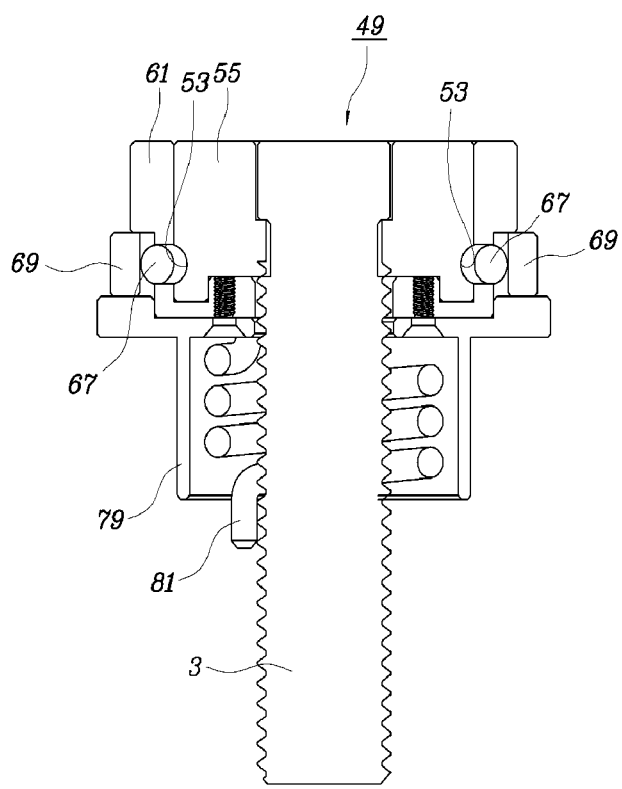
Figure 11:
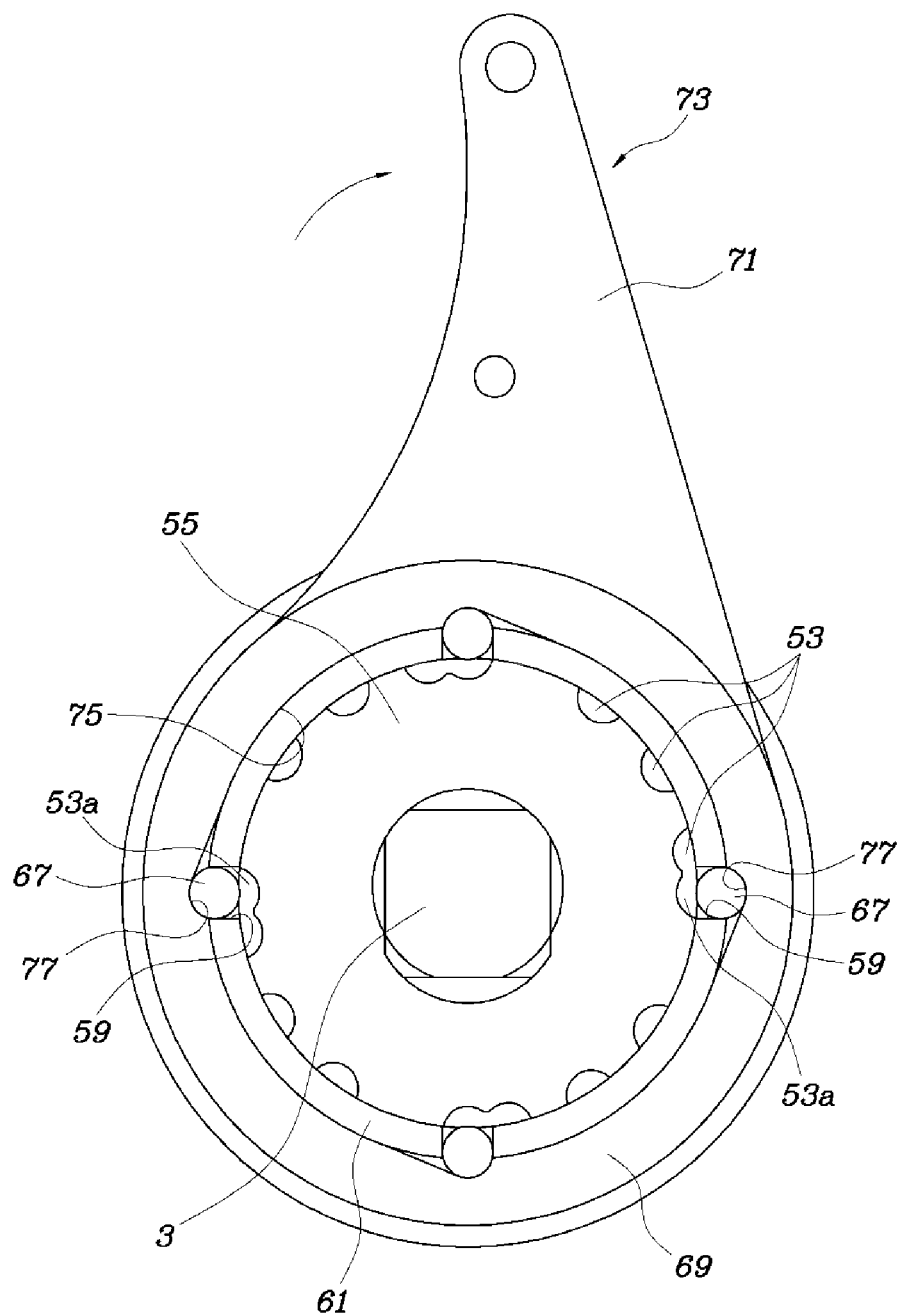

To use the table 15, the user pushes the actuating rod 85 that protrudes outwards from the table housing 5 that has been in the initial retracted state. Then, as shown in FIGS. 4 and 11, the rotating lever 73 is rotated in a clockwise direction around the support shaft 3 by the movement of the actuating rod 85.

As such, if the rotating lever 73 is rotated, the ball bearings 67 are still disposed in the bearing holes 59 at the positions corresponding to the initial position determination depressions 53a, and the ball bearings 67 are allowed to enter the corresponding releasing depressions 77 of the rotating lever 73.

When the ball bearings 67 are allowed to be disposed in the releasing depression 77, the outer hinge 61 and the table housing 5 that is coupled to the outer hinge 61 are released from the ball bearings 67 and enter a released state in which the outer hinge 61 and the housing 5 can rotate around the support shaft 3 with respect to the inner hinge 55 coupled to the rear console 1.

When the user upwardly rotates the table housing 5 that is in the released state, the table housing 5 is rotated around the support shaft 3. At this time, the outer hinge 61 and the rotating lever 73 are rotated (in the clockwise direction in FIG. 11) along with the table housing 5 by the ball bearings 67 that are disposed in the bearing holes 59 and the releasing depressions 77.

Figure 12:
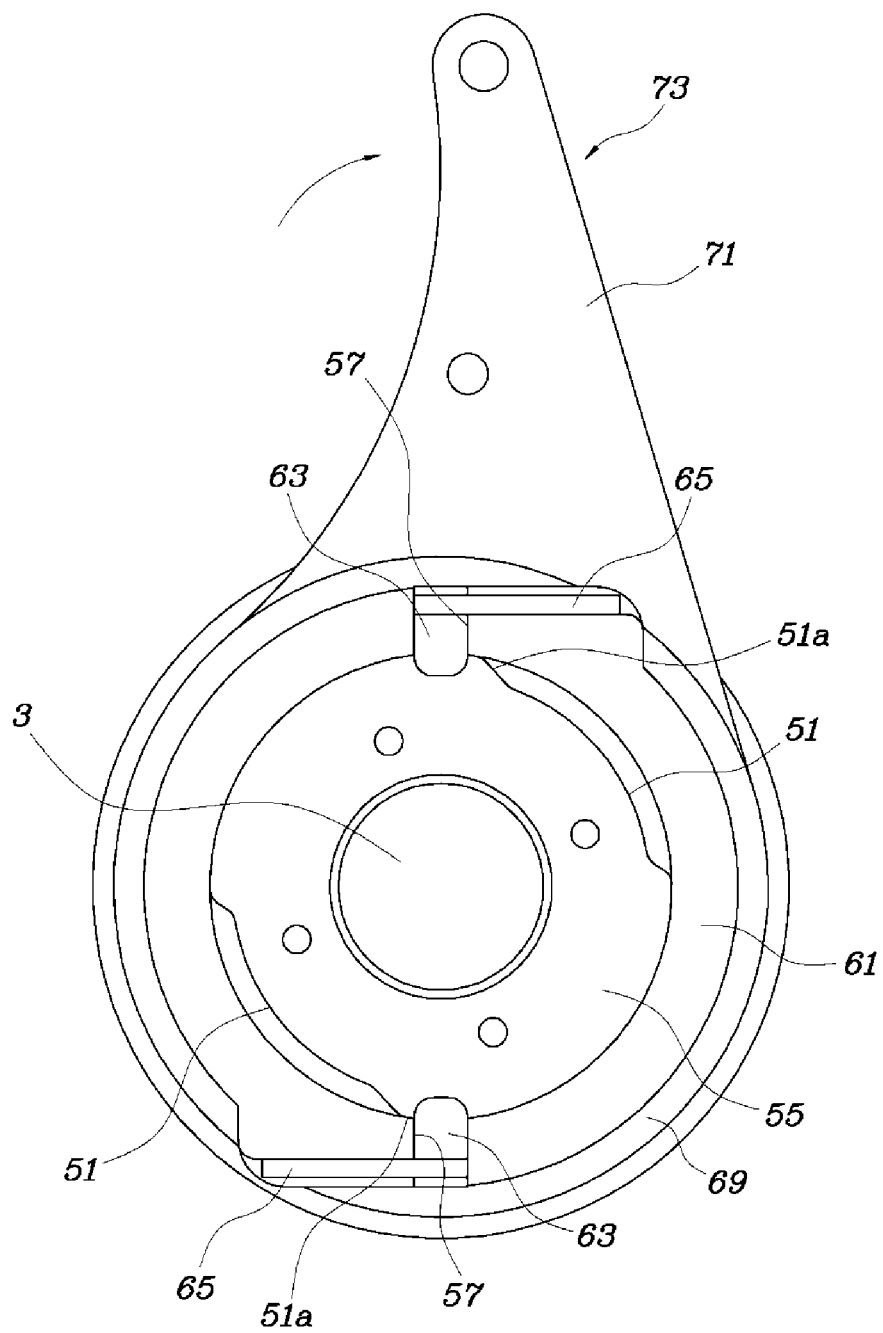

Meanwhile, when the outer hinge 61 rotates along with the table housing 5, as shown in FIG. 12, the stoppers 63 that have been locked to the corresponding stop protrusions 51 a in the stopper depressions 51 of the inner hinge 55 overcome the elastic force of the plate springs 65 and move over the stop protrusions 51a, before moving along the stopper depressions 51.

Thereafter, the user rotates the table housing 5 upwards to a desired position (one of positions M2, M3 and M4 of FIG. 1). Subsequently, the user who has pushed the actuating rod 85 releases it. Then, the rotating lever 73 is rotated in the counterclockwise direction and returned to its original position, and the ball bearings 67 are inserted again into the bearing holes 59, the lever holes 75 and the bearing depressions 53 of the inner hinge 55. Consequently, the table housing 5 that has been rotated upwards can be retained in the selected position by the support force of the ball bearings 67.

Figure 13:
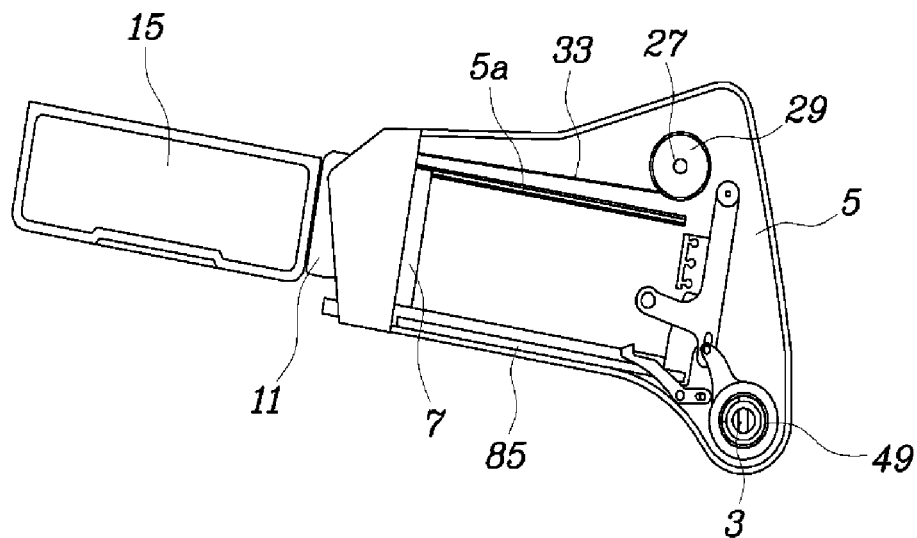
FIG. 13 is a view showing an extracted state of a table according to an exemplary embodiment of the present invention.

After the position of the table housing 5 that has been rotated upwards is fixed, the user pulls the table 15 out of the table housing 5. Then, as shown in FIG. 13, the table 15 is extracted from the table housing 5. Here, the movable body 7 moves along the guide 5a, and the wire 33 is unwound from the wire casing 27 by a distance that the table is extracted.

Figure 14:
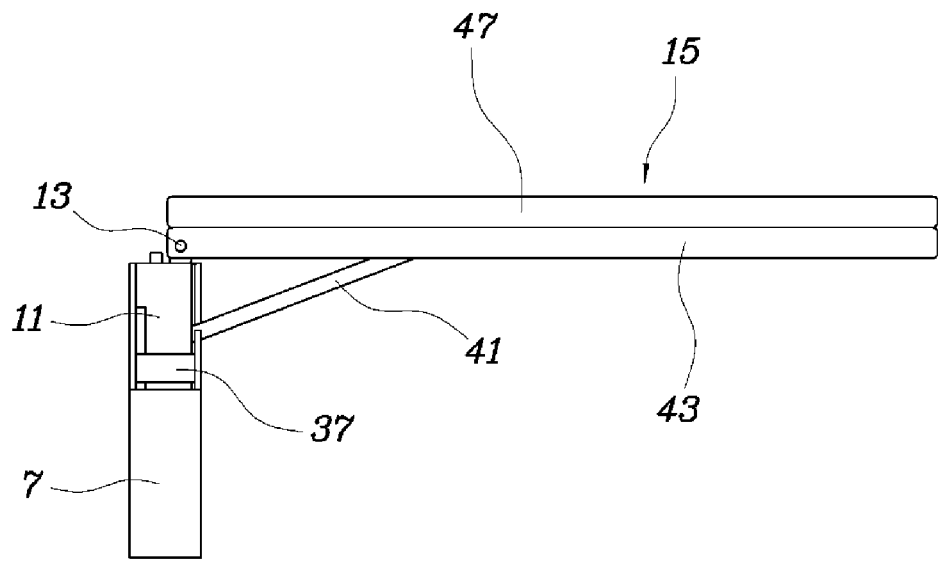
FIGS. 14 and 15 are views showing a table that has been rotated and oriented in the horizontal direction according to an exemplary embodiment of the present invention
Figure 15:
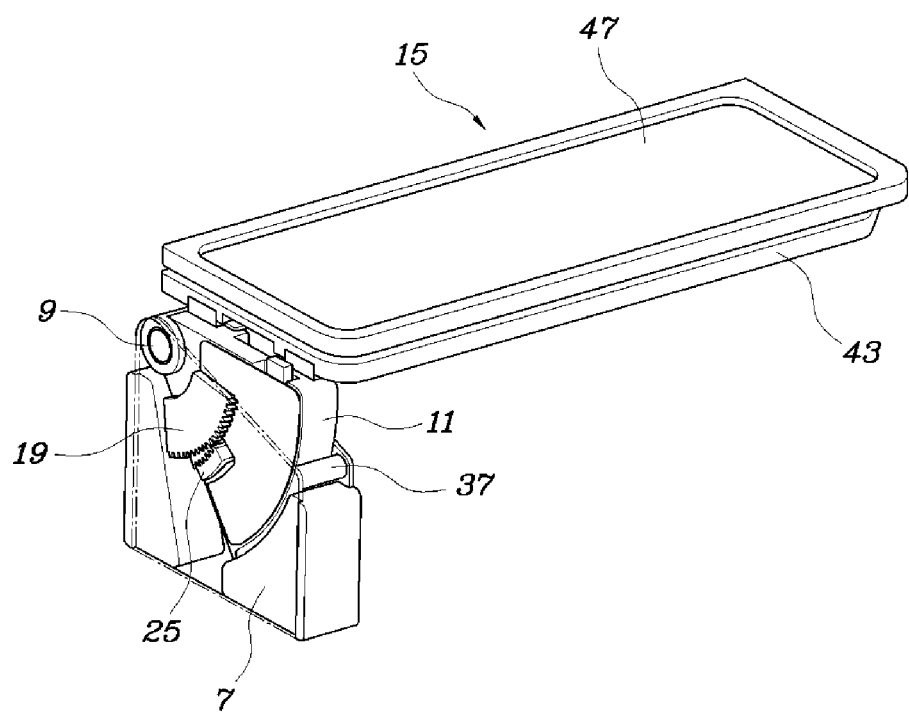
Figure 17:
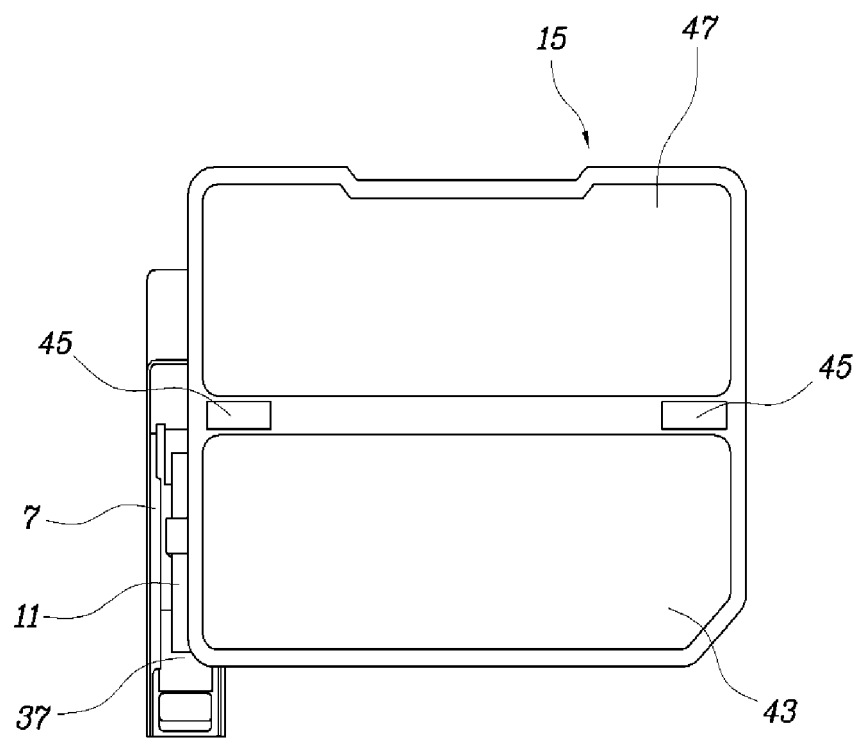
FIG. 17 is a view showing an unfolded state of the table according to an exemplary embodiment of the present invention.

After the table 15 has been extracted, as shown in FIGS. 14 through 15, the table 15 is rotated around the table shaft 13 and is supported by the table support 41, thus entering a usable state. As needed, as shown in FIG. 17, the extension table 47 may be unfolded.

In response to the forward-backward location of the rear seat and the angle at which the seat back is tilted, the user can adjust the tilting angle of the table 15. That is, when the user rotates the rotating body 11 around the body shaft 9 relative to the movable body 7, the tilting angle of the table 15 coupled to the rotating body 11 can be adjusted to a desired angle by controlling engagement between the movable body latch 19 and the rotating body latch 25.

As described above, the table apparatus for rear seat passengers according to the exemplary embodiment of the present invention is advantageous in that when not in use, it is brought into close contact with the sidewall of the rear console and is not exposed to the outside, thus preventing deterioration of the appearance.

Furthermore, when in use, the user can adjust the tilting angle of the table 15 in response to the forward-backward location of the rear seat and the angle at which the seat back is tilted. Therefore, the user can use the table 15 in as comfortable position as possible. As a result, the convenience in use of the table 15 can be markedly enhanced.

For convenience in explanation and accurate definition in the appended claims, the terms "upper", "lower", "inner" and "outer", are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A table apparatus for rear seat passengers, comprising:
    a table housing rotatable upwards and downwards around a support shaft coupled to a sidewall of a rear console;
    a movable body movable along a guide provided in the table housing;
    a rotating body coupled to the movable body by a body shaft and rotatable upwards and downwards with respect to the movable body;
    a table coupled to the rotating body by a table shaft and rotatable leftwards and rightwards with respect to the rotating body;
    a table tilting unit provided in the movable body and the rotating body, the table tilting unit controlling a rotation angle of the rotating body to determine a tilting angle of the table; and
    a rotating roller rotatably coupled to the movable body by a roller shaft, wherein the rotating roller is brought into contact with a front edge of the rotating body, wherein the rotating roller assists movement of the rotating body when the rotating body rotates around the body shaft.

2. The table apparatus as set forth in claim 1, wherein the table tilting unit comprises:
    a movable body latch coupled to the movable body, the movable body having gear teeth on a circumferential arc-shaped surface thereof corresponding to a radius of rotation of the rotating body; and
    a rotating body latch coupled to the rotating body and elastically rotatable by a latch shaft and a latch spring, wherein the rotation angle of the rotating body and the tilting angle of the table are determined depending on conditions at which the rotating body latch is coupled to the movable body latch.

3. The table apparatus as set forth in claim 1, further comprising:
    a wire shaft coupled to the table housing to provide a deceleration and an automatic reception when the table is extracted from or retracted into the table housing;
    a wire casing rotatable around the wire shaft;
    a wire spring coupled at a first end thereof to the wire shaft and coupled at a second end thereof to the wire casing, respectively, thus providing restoring force to the wire casing that is rotated from an original position thereof; and
    a wire connecting the wire casing to the table.

4. The table apparatus as set forth in claim 1, further comprising:
    a rotating body protrusion radially protruding from a lower end of the front edge of the rotating body,
    wherein when the rotating body rotates around the body shaft in a direction in which the rotating body is extracted from the movable body, the rotating body protrusion comes into contact with the rotating roller, thus defining a maximum rotation angle of the rotating body.

5. The table apparatus as set forth in claim 1, further comprising:
    a table support supporting the table in such a way that a first end of the table support is supported on the movable body and a second end thereof supports a lower surface of the table when the table is rotated perpendicular to the rotating body.

6. The table apparatus as set forth in claim 5, wherein the table comprises:
    a base table rotatably coupled to the rotating body by the table shaft, a lower surface of the base table being supported on the table support; and
    an extension table coupled to the base table by a table hinge so as to be foldable and unfoldable.

7. The table apparatus as set forth in claim 1, further comprising
    a table housing tilting unit provided around the support shaft and connected both to the rear console and to the table housing, the table housing tilting unit determining the rotation angle of the table housing.

8. The table apparatus as set forth in claim 7, wherein the table housing tilting unit comprises:
    an inner hinge fastened to the rear console and having, in each of opposite sides of an outer circumferential surface thereof, both a stopper depression defining a range of rotation of the table housing, and bearing depressions determining the rotation angle of the table housing;
    an outer hinge coupled to the table housing, the inner hinge being disposed in the outer hinge, with a stopper hole formed in the outer hinge at a position corresponding to the stopper depression, and bearing holes formed in the outer hinge at positions corresponding to the bearing depressions;

a stopper having a bearing shape and coming into contact with the stopper depression through the stopper hole, the stopper defining, along with the stopper depression, the range of rotation of the table housing;

a plate spring integrally connected at a first end thereof to the stopper and coupled at a second end thereof to the outer hinge, the plate spring bringing the stopper into contact with the stopper depression using elastic force thereof; and a plurality of ball bearings in contact with the respective bearing depressions through the corresponding bearing holes, the ball bearings determining the rotation angle of the table housing when the outer hinge rotates.

9. The table apparatus as set forth in claim 8, wherein the table housing tilting unit comprises:

a rotating lever having:
a lever body part surrounding a portion of the outer hinge in which the bearing holes are formed; and
a lever part integrally extending from the lever body part;

a lever hole formed in the lever body part, the ball bearings coming into contact with an inner surface of the lever body part that defines the lever hole therein; and a plurality of releasing depressions formed in the inner surface of the lever body part and used for unlocking of the ball bearing, the number of releasing depressions corresponding to the number of the ball bearings.

10. The table apparatus as set forth in claim 9, wherein the table housing tilting unit further comprises:

a spring housing in contact with the outer hinge, the spring housing being coupled to the table housing;

a lever spring disposed in the spring housing, the lever spring being coupled at a first end thereof to the table housing and coupled at a second end thereof to the rotating lever, wherein the lever spring provides restoring force to the rotating lever that is rotated from an original position thereof; and a cover plate coupled to a surface of the inner hinge.

11. The table apparatus as set forth in claim 8, wherein the stopper depressions formed in the inner hinge are disposed at symmetric positions based on a center of the inner hinge, each of the stopper depressions extending a predetermined length along the outer circumferential surface of the inner hinge.

12. The table apparatus as set forth in claim 11, wherein a stop protrusion is provided in each of the stopper depressions such that an initial position of the corresponding stopper is determined by the stop protrusion and, when the outer hinge rotates, the stopper is allowed to pass over the stop protrusion.

13. The table apparatus as set forth in claim 8, wherein the bearing depressions are formed in the outer circumferential surface of the inner hinge at positions spaced apart from each other at regular intervals.

14. The table apparatus as set forth in claim 13, wherein an initial position determination depression is formed in the outer circumferential surface of the inner hinge and connected to one among the bearing depressions, the initial position determination depression determining an initial position of the outer hinge.

15. The table apparatus as set forth in claim 9, further comprising an actuating rod connected at a first end thereof to the lever part of the rotating lever while a second end thereof protrudes out of the table housing, the actuating rod being operated by manipulation of a user to actuate the rotating lever.

16. The table apparatus as set forth in claim 15, wherein a lever protrusion integrally protrudes from the lever part so that the rotating lever is connected to the actuating rod by the lever protrusion; and a protrusion hole is formed in an end of the actuating rod, the protrusion hole being fitted over the lever protrusion, wherein the protrusion hole comprises a slot to allow the lever protrusion to move relative to the actuating rod by a predetermined distance when the rotating lever rotates.

* * * * *